(12) United States Patent
Manku et al.

(10) Patent No.: US 10,129,853 B2
(45) Date of Patent: Nov. 13, 2018

(54) OPERATING A MOTION DETECTION CHANNEL IN A WIRELESS COMMUNICATION NETWORK

(71) Applicant: Cognitive Systems Corp., Waterloo (CA)

(72) Inventors: Tajinder Manku, Waterloo (CA); Oleksiy Kravets, Petersburg (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/176,489

(22) Filed: Jun. 8, 2016

(65) Prior Publication Data

US 2017/0359804 A1    Dec. 14, 2017

(51) Int. Cl.
*H04W 72/04*      (2009.01)
*H04L 12/26*      (2006.01)
(Continued)

(52) U.S. Cl.
CPC ........ *H04W 72/04* (2013.01); *G08B 13/2491* (2013.01); *H04L 43/12* (2013.01);
(Continued)

(58) Field of Classification Search
CPC ....... H04W 4/008; H04W 4/02; H04W 4/023; H04W 4/025; H04W 4/043; H04W 8/22; H04W 8/005; H04W 12/02; H04W 12/04; H04W 12/06; H04W 12/08; H04W 24/00; H04W 24/08; H04W 28/04; H04W 28/0215; H04W 52/0254; H04W 76/023; H04W 76/026; H04W 84/12; H04W 88/06; H04L 12/2803; H04L 12/2816;
(Continued)

(56) References Cited

U.S. PATENT DOCUMENTS 4,054,879 A    10/1977   Wright et al.
4,075,573 A    2/1978    Kennedy et al.
(Continued)

FOREIGN PATENT DOCUMENTS

CA    2834522    5/2014
CA    2945702    8/2015
(Continued)

OTHER PUBLICATIONS

Non-Final Office Action received in U.S. Appl. No. 15/099,833, dated Jun. 27, 2016, 16 pages.
(Continued)

*Primary Examiner* — Peter Chen
(74) *Attorney, Agent, or Firm* — Henry Patent Law Firm PLLC

(57) ABSTRACT

In a general aspect, a motion detection channel is operated in a wireless communication network. In some aspects, a first wireless network device communicates wireless network traffic on a first subset of wireless communication channels in a wireless communication network. The first wireless network device receives motion detection signals transmitted through a space by a second wireless network device. The motion detection signals are received on a second subset of wireless communication channels. The motion detection signals are processed to detect motion of an object in the space.

19 Claims, 7 Drawing Sheets

(51) Int. Cl.
*H04W 24/08* (2009.01)
*G08B 13/24* (2006.01)
*H04W 84/12* (2009.01)
*H04W 88/08* (2009.01)

(52) U.S. Cl.
CPC ............ *H04W 24/08* (2013.01); *H04W 84/12* (2013.01); *H04W 88/08* (2013.01)

(58) Field of Classification Search
CPC ... H04L 12/2827; H04L 12/283; H04L 67/12; H04L 67/125
See application file for complete search history.

(56) References Cited

U.S. PATENT DOCUMENTS

| | | | |
|---|---|---|---|
| 4,193,055 | A | 3/1980 | Barnum |
| 4,225,858 | A | 9/1980 | Cole et al. |
| 4,286,260 | A | 8/1981 | Gershberg et al. |
| 4,649,388 | A | 3/1987 | Atlas |
| 4,740,045 | A | 4/1988 | Goodson et al. |
| 4,870,663 | A | 9/1989 | Kulju et al. |
| 5,270,720 | A | 12/1993 | Stove |
| 5,519,400 | A | 5/1996 | McEwan |
| 5,696,514 | A | 12/1997 | Nathanson et al. |
| 6,075,797 | A | 6/2000 | Thomas |
| 6,493,380 | B1 | 12/2002 | Wu et al. |
| 6,573,861 | B1 | 6/2003 | Hommel et al. |
| 7,047,015 | B2 | 5/2006 | Hawe |
| 7,295,109 | B2 | 11/2007 | Kobayashi |
| 7,317,419 | B2 | 1/2008 | Sugar et al. |
| 7,652,617 | B2 | 1/2010 | Kurtz et al. |
| 7,916,066 | B1 | 3/2011 | Osterweil |
| 8,138,918 | B2 | 3/2012 | Habib et al. |
| 8,710,984 | B2 | 4/2014 | Wilson et al. |
| 8,818,288 | B2 | 8/2014 | Patwari et al. |
| 8,836,344 | B2 | 9/2014 | Habib et al. |
| 9,030,321 | B2 | 5/2015 | Breed |
| 9,143,413 | B1 | 9/2015 | Manku et al. |
| 9,143,968 | B1 | 9/2015 | Manku et al. |
| 9,523,760 | B1 | 12/2016 | Kravets et al. |
| 9,524,628 | B1 | 12/2016 | Omer et al. |
| 9,551,784 | B2 | 1/2017 | Katuri |
| 9,584,974 | B1 | 2/2017 | Omer et al. |
| 9,743,294 | B1 | 8/2017 | Omer et al. |
| 9,927,519 | B1 | 3/2018 | Omer et al. |
| 9,933,517 | B1 | 4/2018 | Olekas et al. |
| 2001/0046870 | A1 | 11/2001 | Stilp et al. |
| 2003/0007473 | A1 | 1/2003 | Strong et al. |
| 2003/0108119 | A1 | 6/2003 | Mohebbi et al. |
| 2005/0055568 | A1 | 3/2005 | Agrawala et al. |
| 2005/0083199 | A1 | 4/2005 | Hall et al. |
| 2006/0217132 | A1 | 9/2006 | Drummond-Murray et al. |
| 2007/0293232 | A1* | 12/2007 | Nonaka ................. H04W 24/00 455/450 |
| 2008/0119130 | A1* | 5/2008 | Sinha .................... H04W 12/06 455/1 |
| 2008/0240008 | A1 | 10/2008 | Backes et al. |
| 2008/0303655 | A1 | 12/2008 | Johnson |
| 2009/0040952 | A1 | 2/2009 | Cover et al. |
| 2009/0062696 | A1 | 3/2009 | Nathan et al. |
| 2009/0079615 | A1 | 3/2009 | Wu et al. |
| 2009/0128302 | A1 | 5/2009 | Srinivasan et al. |
| 2009/0128360 | A1 | 5/2009 | Bianchi et al. |
| 2010/0013636 | A1 | 1/2010 | Wu |
| 2010/0026490 | A1 | 2/2010 | Butler et al. |
| 2010/0103020 | A1 | 4/2010 | Wu |
| 2010/0315284 | A1 | 12/2010 | Trinza et al. |
| 2011/0130092 | A1* | 6/2011 | Yun ..................... H04W 72/085 455/39 |
| 2011/0148689 | A1 | 6/2011 | Filippi et al. |
| 2012/0009882 | A1 | 1/2012 | Patwari et al. |
| 2012/0011365 | A1 | 1/2012 | Schmidt et al. |
| 2012/0115512 | A1 | 5/2012 | Grainger et al. |
| 2012/0146788 | A1* | 6/2012 | Wilson ................. G08B 13/187 340/539.23 |
| 2012/0184296 | A1 | 7/2012 | Milosiu |
| 2012/0212366 | A1 | 8/2012 | Alalusi |
| 2013/0005280 | A1 | 1/2013 | Leung et al. |
| 2013/0090151 | A1 | 4/2013 | Ngai et al. |
| 2013/0162459 | A1 | 6/2013 | Aharony et al. |
| 2013/0283256 | A1 | 10/2013 | Proud |
| 2014/0004874 | A1 | 1/2014 | Schwartz et al. |
| 2014/0015706 | A1 | 1/2014 | Ishihara et al. |
| 2014/0128778 | A1 | 5/2014 | Chan et al. |
| 2014/0135042 | A1 | 5/2014 | Buchheim et al. |
| 2014/0140231 | A1 | 5/2014 | Haiut et al. |
| 2014/0247179 | A1 | 9/2014 | Furuskog |
| 2014/0285324 | A1 | 9/2014 | Austin |
| 2014/0286380 | A1 | 9/2014 | Prager et al. |
| 2014/0301260 | A1* | 10/2014 | Park ...................... H04W 74/06 370/311 |
| 2015/0043377 | A1* | 2/2015 | Cholas .................. H04W 48/08 370/254 |
| 2015/0063323 | A1 | 3/2015 | Sadek et al. |
| 2015/0078295 | A1 | 3/2015 | Mandyam et al. |
| 2015/0098377 | A1* | 4/2015 | Amini ................ H04W 52/0209 370/311 |
| 2015/0189528 | A1 | 7/2015 | Carbajal |
| 2015/0195100 | A1* | 7/2015 | Imes ..................... H04L 12/282 455/420 |
| 2015/0212205 | A1 | 7/2015 | Shpater |
| 2015/0245164 | A1* | 8/2015 | Merrill .................... H04W 4/06 370/329 |
| 2015/0292879 | A1 | 10/2015 | Zhou et al. |
| 2015/0338507 | A1 | 11/2015 | Oh et al. |
| 2015/0350976 | A1 | 12/2015 | Kodali et al. |
| 2016/0018508 | A1 | 1/2016 | Chen et al. |
| 2016/0183059 | A1 | 6/2016 | Nagy et al. |
| 2016/0187475 | A1 | 6/2016 | Horng et al. |
| 2016/0210838 | A1* | 7/2016 | Yan ....................... G08B 21/043 |
| 2016/0241999 | A1* | 8/2016 | Chin ..................... H04W 4/021 |
| 2017/0042488 | A1 | 2/2017 | Muhsin |
| 2017/0146656 | A1 | 5/2017 | Belsley et al. |
| 2017/0195893 | A1 | 7/2017 | Lee et al. |
| 2017/0309146 | A1 | 10/2017 | Mackenzie et al. |
| 2017/0343658 | A1 | 11/2017 | Ramirez et al. |

FOREIGN PATENT DOCUMENTS

| | | |
|---|---|---|
| WO | 2014/021574 | 2/2014 |
| WO | 2014201574 | 12/2014 |
| WO | 2015/168700 | 11/2015 |

OTHER PUBLICATIONS

Non-Final Office Action received in U.S. Appl. No. 15/151,571, dated Aug. 5, 2016, 18 pages.
Canadian Intellectual Property Office; International Search Report & Written Opinion dated Jan. 17, 2017 for PCT/CA2016/051229; 9 pages.
United States Patent & Trademark Office; Notice of Allowance received in U.S. Appl. No. 15/228,418, dated Oct. 12, 2016, 9 pages.
United States Patent & Trademark Office; Notice of Allowance received in U.S. Appl. No. 15/099,833, dated Oct. 14, 2016, 8 pages.
United States Patent & Trademark Office; Notice of Allowance received in U.S. Appl. No. 15/151,571, dated Jan. 10, 2017, 9 pages.
Japan Radio Co., Ltd; "26GHz FWA—Technology"; http://www.jrc.co.jp/eng/product/lneup/26ghz_wireless_ip_access_system/tech.html; 3 pages; May 15, 2016.
Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016.
CEVA; "CEVA's DSP Cores Power the World's Leading Mobile Broadband and M2M Applications"; http://www.ceva-dsp.com/Mobile-Broadband; 3 pages; May 15, 2016.
Quora.com; "What is the function of the baseband processor in wireless devices?"; https://ww.quora.com/What-is-the-function-of-the-baesband-processor-in-wireless-devices; 2 pages; May 15, 2016.

(56) References Cited

OTHER PUBLICATIONS

Wikipedia; "Baseband processor"; rhttps://en.wikipedia.org/wiki/Bandband_processor; 2 pages; version dated Apr. 20, 2016.
Canadian Intellectual Property Office, International Search Report and Written Opinion for International Application No. PCT/CA2017/050037 dated Apr. 13, 2017, 12 pages.
Canadian Intellectual Property Office, International Search Report and Written Opinion issued International Application No. PCT/CA2016/051228 dated Apr. 25, 2017, 8 pages.
Canadian Intellectual Property Office, International Search Report and Written Opinion issued in International Application No. PCT/CA2016/051466 dated Mar. 14, 2017, 9 pages.
Netgear, "N600 Wifi Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, 101 pages.
Openwrt, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.
USPTO, Non-final Office Action issued in U.S. Appl. No. 15/461,125 dated Apr. 19, 2017, 56 pages.
USPTO, Notice of Allowance issued in U.S. Appl. No. 15/460,643 dated Jun. 12, 2017, 34 pages.
USPTO, Notice of Allowance issued in U.S. Appl. No. 15/461,125 dated Aug. 30, 2017, 15 pages.
USPTO, Non-Final Office Action dated Dec. 28, 2017, in U.S. Appl. No. 15/789,761, 31 pgs.
USPTO, Non-Final Office Action received in U.S. Appl. No. 15/799,768 dated Dec. 13, 2017, 7 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 31 pgs.
USPTO; Restriction Requirement dated Jan. 23, 2018, in U.S. Appl. No. 15/706,295.
USPTO, Notice of Allowance dated Jan. 10, 2018, in U.S. Appl. No. 15/803,189, 28 pgs.
USPTO; Non-Final Office Action dated Jan. 23, 2018, in U.S. Appl. No. 15/789,815, 35 pgs.
Wei, et al., "Radio-based Device-free Activity Recognition with Radio Frequency Interference", IPSN '15 Proceedings of the 14th International Conference on Information Processing in Sensor Networks, Apr. 13-16, 2015, 12 pgs.
Zheng, et al., "Detecting Radio Frequency Interference for CSI Measurements on COTS WiFi Devices", IEEE ICC 2017, Ad-Hoc and Sensor Networking Symposium, May 2017, 6 pgs.
USPTO, Non-Final Office Action issued in U.S. Appl. No. 15/691,195 dated Nov. 15, 2017; 17 pgs.
USPTO, Notice of Allowance dated Jan. 29, 2018, in U.S. Appl. No. 15/461,125, 16 pgs.
USPTO, Notice of Allowance dated May 2, 2018, in U.S. Appl. No. 15/691,195, 21 pgs.
USPTO, Notice of Allowance dated Feb. 13, 2018, in U.S. Appl. No. 15/683,637, 25 pgs.
USPTO, Notice of Allowance dated May 1, 2018, in U.S. Appl. No. 15/799,768, 27 pgs.
USPTO, Non-Final Office Action dated Jan. 26, 2018, in U.S. Appl. No. 15/815,199, 36 pgs.
USPTO, Non-Final Office Action dated Mar. 14, 2018, in U.S. Appl. No. 15/706,295, 39 pgs.
USPTO, Notice of Allowance dated Mar. 8, 2018, in U.S. Appl. No. 15/706,193, 40 pgs.
USPTO, Non-Final Office Action dated Mar. 9, 2018, in U.S. Appl. No. 15/836,606, 49 pgs.
USPTO, Restriction Requirement dated Mar. 28, 2018, in U.S. Appl. No. 15/799,806, 5 pgs.
CIPO, International Search Report and Written Opinion dated Feb. 9, 2018, in PCT/CA2017/051276, 9 pgs.
CIPO, International Search Report and Written Opinion dated Jan. 26, 2018, in PCT/CA2017/051290, 9 pgs.
Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Hyder, et al., "Acoustic Scene Classification using a CNN-SuperVector system trained with Auditory and Spectrogram Image Features", Interspeech 2017, Stockholm Sweden, Aug. 20-24, 2017, 5 pgs.
Li, et al., "A Convolutional Neural Network Cascade for Face Detection", IEEE, 2015, 10 pgs.
Tsironi, et al., "Gesture Recognition with a Convolutional Long Short-Term Memory Recurrent Neural Network", European Symposium on Artificial Neural Networks, Computational Intelligence and Machine Learning, Bruges (Belgium), Apr. 27-29, 2016, 6 pgs.
Zheng, et al., "Time Series Classification Using Multi-Channels Deep Convolutional Neural Networks", 2014, 13 pgs.

* cited by examiner

OPERATING A MOTION DETECTION CHANNEL IN A WIRELESS COMMUNICATION NETWORK

BACKGROUND

The following description relates to operating a motion detection channel in a wireless communication network.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

Figure 1A:
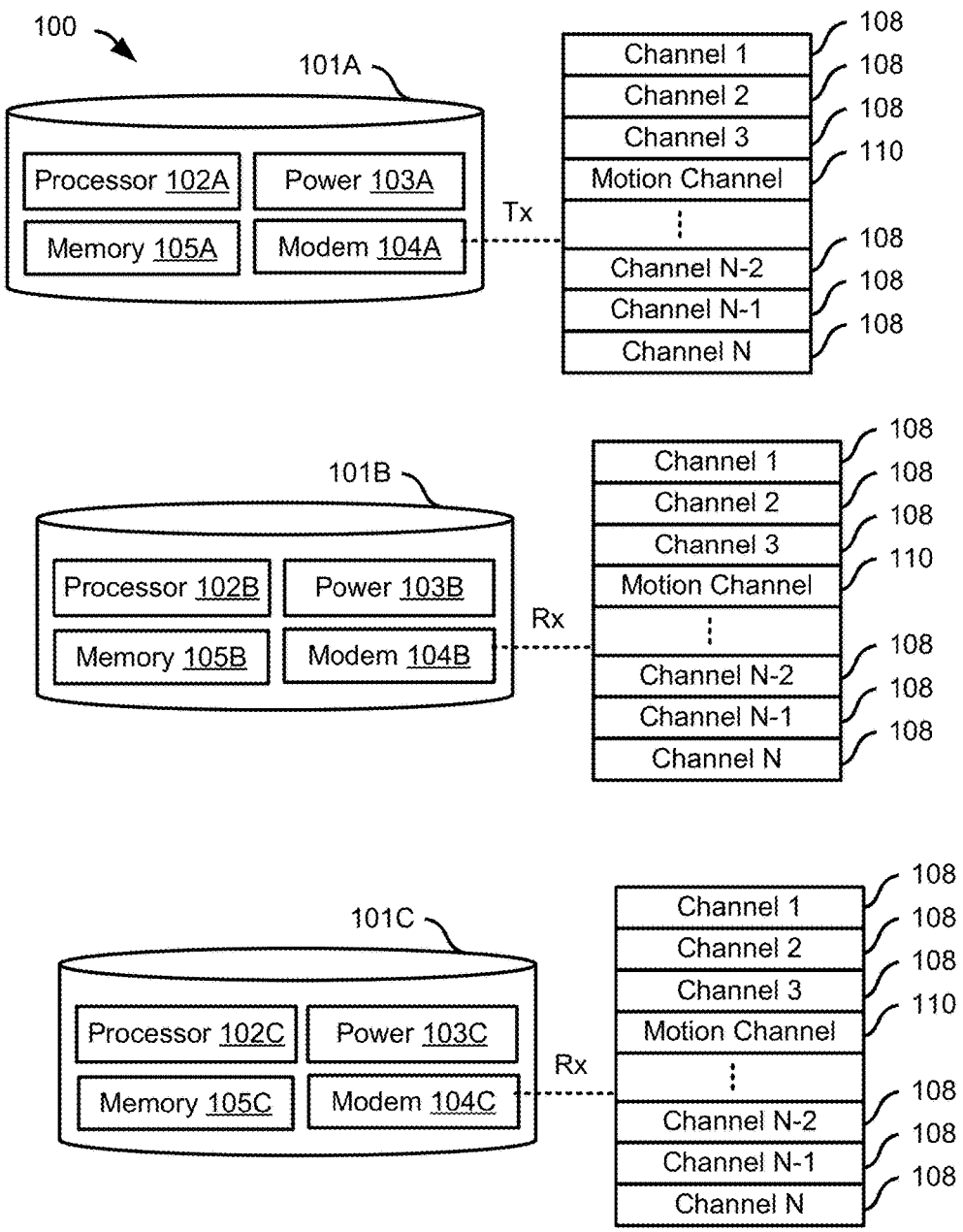
FIG. 1A is a diagram showing an example wireless network system.

In some aspects of what is described, a wireless communication network includes a motion detection channel. For example, a motion detection channel can be embedded in a wireless communication network to perform motion detection operations alongside other wireless communication network operations. In some implementations, a motion detection channel can be operated in parallel with other wireless communication channels that execute wireless signaling protocols. In some implementations, a chipset in a wireless network device uses a motion detection channel to detection motion in a space, and the same chipset uses another wireless communication channel to communicate wireless network traffic, for example, with other wireless devices.

In some implementations, the motion detection channel is used to transmit motion detection signals that are used to determine motion. The motion detection signal may be used in a manner that is analogous to a radar signal. For example, there can be a transmitted signal (e.g., sent from a first wireless network device) on the motion detection channel and a reflected signal (e.g., received at a second wireless network device) on the motion detection channel. In some cases, the reflected signal may contain motion information (velocity, location, etc) based on interactions with objects in a target environment, for instance, in a space that is accessed by the transmitted signal. The reflected signal may be analyzed, for example, to detect motion of such objects.

In some implementations, a motion detection channel can be included in a wireless communication standard. For instance, a wireless communication network can define a set of wireless communication channels according to a wireless communication standard, and one or more of the wireless communication channels can be allocated for motion detection. As an example, one or more motion standard wireless communication channels in a Wideband Code Division Multiple Access (WCDMA) standard, a Long-Term Evolution (LTE) standard, one or more of the 802.11 family of standards developed by IEEE, a BLUETOOTH® standard, a ZigBee standard or another wireless communication standard can be allocated as a motion detection channel for motion detection. In some wireless communication standards, the wireless communication channels are assigned names (e.g., "channel 1," "channel 2," etc.) or other types of identifiers. The wireless communication channels can be defined in frequency (e.g., where each wireless communication channel occupies a given bandwidth in a frequency range), in code (e.g., where each wireless communication channel has a channel code) or otherwise.

In some example implementations, a motion detection signal is repeatedly transmitted on a motion detection channel to probe for motion in a space. The motion detection signal can include, for example, a reference signal (e.g., a pseudorandom code or another reference) generated for motion detection, a beacon signal (e.g., Bluetooth Beacons, Wi-Fi Beacons, other wireless beacon signals) or another standard signal generated for other purposes according to a wireless communication standard or another type of repeated signal. In some examples, motion detection signals propagate through an object (e.g., a wall) before or after interacting with a moving object, which may allow the object's movement to be detected without an optical line-of-sight between the moving object and the transmission or receiving hardware. Motion detector systems may be used in larger systems, such as a security system, that may include a control center for monitoring movement within a space, such as a room, building, outdoor area, etc.

FIG. 1A is a diagram showing aspects of an example wireless network system 100. The example wireless network system 100 includes three wireless network devices 101A, 101B, 101C. The example wireless network system 100 may include additional wireless network devices and other components (e.g., one or more wireless network servers, wireless network routers, wireless network switches, cables or other communication links, etc.).

The example wireless network system 100 can operate as a wireless communication network, for example, according to a wireless communication standard or another type of wireless communication protocol. For example, the wireless network system 100 may be configured to operate as a Wireless Local Area Networks (WLAN), a cellular network, a Personal Area Network (PAN), a metropolitan area network (MAN), or another type of wireless communication network. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In the example shown in FIG. 1A, each of the wireless network devices 101A, 101B, 101C includes a respective processor, power supply, memory and modem. The wireless network devices 101A, 101B, 101C may include additional or different components, and they may be configured to operate as shown in FIG. 1A or in another manner. In some implementations, all of the wireless network devices 101A, 101B, 101C are the same type of device. In some implementations, one or more of the wireless network devices 101A, 101B, 101C is different from the others.

The example wireless network device 101A includes the processor 102A, the power supply 103A, the modem 104A and the memory 105A. In some implementations, the processor 102A, the power supply 103A, the modem 104A and the memory 105A are housed together in a common housing or other assembly. In some implementations, one or more of the components can be housed separately, for example, in a separate housing or other assembly.

The example modem 104A can communicate (receive, transmit, or both) wireless signals. For example, the modem 104A may be configured to communicate radio frequency signals formatted according to a wireless communication standard. The modem 104A may be implemented as the example wireless network modem 104 shown in FIG. 1B, or the modem 104A may be implemented in another manner, for example, with other types of components or subsystems.

In the example shown, the modem 104A can communicate on multiple wireless communication channels. For example, the wireless communication channels may be defined by a wireless communication standard or other wireless communication protocol. The wireless communication channels are used in the example wireless network system 100 to transfer data between wireless devices. As shown in FIG. 1A, the wireless network system 100 supports communication on N+1 distinct wireless communication channels, which include N distinct network traffic channels 108 for transferring wireless traffic (e.g., data packets) between wireless devices, and one motion detection channel 110 for transferring motion detection signals between wireless devices. In some cases, a wireless network system or an individual wireless network device may support other types of wireless communication channels, or additional wireless communication channels of the same type (e.g., multiple motion detection channels). In some cases, two or more adjacent wireless communication channels can be combined to form one motion detection channel, which may increase the frequency bandwidth of the motion detection channel.

In some implementations, the wireless communication channels (including the network traffic channels 108 and motion detection channel 110) are frequency channels. For example, each of the wireless communication channels may occupy or otherwise correspond to a distinct frequency bandwidth within a licensed or unlicensed band of wireless spectrum. The frequency channels may include overlapping bandwidths or non-overlapping bandwidths. In some Wi-Fi standards, each frequency channel corresponds to a distinct center frequency and has a frequency bandwidth. In an example, the center frequencies are separated by 5 MHz (e.g., 2.412 GHz, 2.417 GHz, 2.422 GHz, etc.) and each channel has a bandwidth of 20 MHz. The modem 104A of the wireless network device 101A may be configured to communicate on other types of frequency channels, for example, that have other frequency spacings or frequency bandwidths.

In some implementations, the wireless communication channels (including the network traffic channels 108 and motion detection channel 110) are coded channels. For example, each of the wireless communication channels may correspond to a distinct spreading code and operate within a common frequency range in a licensed or unlicensed band of wireless spectrum. In some cases, spreading codes are used to generate spread spectrum transmissions on each respective coded channel, for example, to avoid interference between coded channels in the same frequency range. In some types of code division multiple access (CDMA) standards, each coded channel corresponds to a distinct channel code that is combined with a data signal to generate the channel-coded signal. In an example, each channel code is a pseudorandom binary code. In some cases, multiple (e.g., some or all) of the coded channels share the same frequency bandwidth. The modem 104A of the wireless network device 101A may be configured to communicate on other types of coded channels.

In some implementations, the wireless communication channels (including the network traffic channels 108 and motion detection channel 110) include frequency channels and coded channels. For example, some or all the network traffic channels 108 can be frequency channels, and the motion detection channel 110 can be a coded channel. As another example, some or all the network traffic channels 108 can be coded channels, and the motion detection channel 110 can be a frequency channel.

In some implementations, the example modem 104A includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires or other types of connections.

In some cases, a radio subsystem in the modem 104A can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include the radio chip 112 and the RF front end 113 shown in FIG. 1B. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc.

In some cases, a baseband subsystem in the modem 104A can include, for example, digital electronics configured to process digital baseband data. As an example, the baseband subsystem may include the baseband chip 111 shown in FIG. 1B. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 104A receives baseband signals from the baseband subsystem, up-converts the baseband signals to radio frequency signals, and wirelessly transmits the radio frequency signals (e.g., through an antenna). In some instances, the radio subsystem in the example modem 104A wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 104A can communicate wireless network traffic (e.g., data packets) in the wireless communication network through the radio subsystem on one or more of the network traffic channels 108. The baseband subsystem of the modem 104A may also transmit or receive (or both) motion detection signals (e.g., motion detection packets) through the radio subsystem on the motion detection channel 110. In some instances, the baseband subsystem generates the motion detection signals for transmission, for example, in order to probe a space for motion. In some instances, the baseband subsystem processes received motion detection signals, for example, to detect motion of an object in a space.

The example processor 102A can execute instructions, for example, to generate output data based on data inputs. The instructions can include programs, codes, scripts or other types of data stored in memory. Additionally or alternatively, the instructions can be encoded as pre-programmed or re-programmable logic circuits, logic gates, or other types of hardware or firmware components. The processor 102A may be or include a general purpose microprocessor, as a specialized co-processor or another type of data processing apparatus. In some cases, the processor 102A performs high level operation of the wireless network device 101A. For example, the processor 102A may be configured to execute or interpret software, scripts, programs, functions, executables, or other modules stored in the memory 105A. In some implementations, the processor 102A may be included in the modem 104A.

The example memory 105A can include computer-readable media, for example, a volatile memory device, a non-volatile memory device, or both. The memory 105A can include one or more read-only memory devices, random-access memory devices, buffer memory devices, or a combination of these and other types of memory devices. In some instances, one or more components of the memory can be integrated or otherwise associated with another component of the wireless network device 101A.

The example power supply 103A provides power to the other components of the wireless network device 101A. For example, the processor 102A, the memory 105A and the modem 104A may operate based on electrical power provided by the power supply 103A through a voltage bus or other connection. In some implementations, the power supply 103A includes a battery or a battery system, for example, a rechargeable battery. In some implementations, the power supply 103A includes an adapter (e.g., and AC adapter) that receives an external power signal (from an external source) and coverts the external power signal to an internal power signal conditioned for a component of the wireless network device 101A. The power supply 103A may include other components or operate in another manner.

The wireless network device 101B includes the processor 102B, the power supply 103B, the modem 104B and the memory 105B; and the wireless network device 101C includes the processor 102C, the power supply 103C, the modem 104C and the memory 105C. The components of the wireless network devices 101B, 101C can be implemented as the components of the wireless network device 101A described above or in another manner.

In the example shown in FIG. 1A, the wireless network devices 101A, 101B, 101C use the wireless communication channels (including the network traffic channels 108 and motion detection channel 110) to communicate wireless signals. In the example shown, the wireless network device 101A transmits wireless signals, and the wireless network devices 101B, 101C receive the wireless signals transmitted by the wireless network device 101A. The wireless network device 101A may send wireless signals to other devices (e.g., a user equipment, a client device, a server, etc.), and similarly the wireless network devices 101B, 101C may receive wireless signals from other devices.

In some instances, the wireless network device 101A uses one or more of the network traffic channels 108 to communicate (send or receive) wireless network traffic. For example, the wireless network device 101A may use one or more of the network traffic channels 108 to communicate wireless data packets between a server system and a client system. As another example, the wireless network device 101A may use one or more of the network traffic channels 108 to communicate wireless data packets between nodes in a peer-to-peer or mesh network topology. As another example, the wireless network device 101A may use one or more of the network traffic channels 108 to broadcast beacon signals, power signals or other types of wireless network traffic. In some instances, the wireless signals are transmitted from the wireless network device 101A, for example, to a client device or another node in the wireless communication network. In some instances, the wireless signals are received at the wireless network device 101A, for example, from a client device or another node in the wireless communication network.

In some instances, the wireless network device 101A uses the motion detection channel 110 to communicate motion detection signals. For example, the wireless network device 101A may use the motion detection channel 110 to communicate motion detection signals formatted according to the example motion channel packet 202 shown in FIG. 2 or motion detection signals of another type. In some cases, the motion detection signals communicated on the motion detection channel 110 include reference signals (e.g., a pseudorandom code or another type of reference signal) generated for motion detection. In some cases, the motion detection signals communicated on the motion detection channel 110 include wireless network signals (e.g., beacon signals, status signals) that are repeated periodically, for example, according to a wireless communication standard. The motion detection signals can be sent on the motion detection channel 110 at scheduled times, at periodic or random intervals or in other time steps. In some cases, the wireless signal is transmitted multiple times per second, per minute, per hour, etc.

In some cases, the motion detection signals are communicated from the wireless network device 101A through a target environment. The target environment can include, for example, air, solid materials, liquids or another medium through which the wireless electromagnetic signal may propagate. The target environment can include multiple paths for a transmitted wireless electromagnetic signal, and the transmitted signal can be reflected off or scattered by a surface in the target environment. Reflection or scattering may occur as a result of the transmitted signal being incident upon an impedance discontinuity, which may occur at a boundary between distinct materials, such as a boundary between air and a wall, a boundary between air and a person, or other boundaries. In some instances, when a transmitted signal becomes incident upon a boundary between a first material (e.g., air) and a second material (e.g., a wall), a portion of the transmitted signal can be reflected or scattered at the boundary between the air and the wall. Additionally, another portion of the transmitted signal may continue to propagate through the wall, it may be refracted or affected in another manner. Further, the other portion that propagates through the wall may be incident upon another boundary, and a further portion may be reflected or scattered at that boundary and another portion may continue to propagate through the boundary.

In some instances, a motion detection signal from the wireless network device 101A traverses one or more paths through a space and forms a received signal at one or both of the wireless network devices 101B, 101C. Interactions along the signal path can result in an attenuation and a phase offset relative to the transmitted signal due to the path length, reflectance or scattering of the signal, or other factors. Hence, the received signal at the wireless network devices 101B, 101C can have different components that have different attenuations and phase offsets relative to the transmitted signal. When an object that reflects, scatters or otherwise interacts with a signal in a path moves, a component of the received signal at the wireless network devices 101B, 101C can change. For example, a path length can change resulting in a smaller or greater phase offset, or resulting in more or less attenuation of the signal. Hence, changes caused by the movement of the object can be detected in the received signal in some cases.

In some aspects of operation, the modems 104A, 104B, 104C of the respective wireless network devices 101A, 101B, 101C communicate wireless network traffic in the wireless communication network on one or more of the network traffic channels 108. In some instances, the modem 104A transmits motion detection signals on the motion detection channel 110, and the modems 104B, 104C receive the motion detection signals on the motion detection channel 110. The modems 104B, 104C may then process the motion detection signals to detect motion of an object in a space accessed by the motion detection signals. For example, the motion detection signals may each include control data and a motion probe, and the modems 104B, 104C may each compare the motion probes from the respective motion detection signals to detect motion in the space. In some cases, changes in the motion probe over time indicates motion in the space, and an indication of motion can be generated in response to detecting such changes. The space accessed by the motion detection signals can be an indoor or outdoor space, which may include, for example, one or more fully or partially enclosed areas, an open areas without enclosure, etc.

Figure 1B:
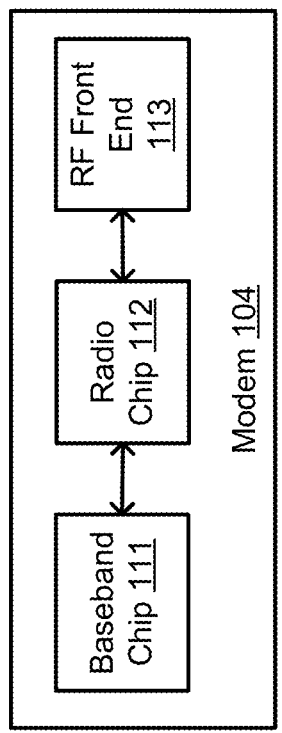
FIG. 1B is a diagram showing an example modem.

FIG. 1B is a diagram showing an example wireless network modem 104. In some examples, the wireless network modem 104 can be implemented as a card, a chip, a chipset or another type of device. A modem may generally include a radio subsystem and a baseband subsystem, along with software or firmware for one or more wireless communication standards or other protocols. In some cases, a modem includes hardware, software or firmware (or combinations thereof) to support multiple wireless communication standards (e.g., 3G and LTE).

The example wireless network modem 104 shown in FIG. 1B may be operated as the example modems 104A, 104B, 104C in the respective wireless network devices 101A, 101B, 101C shown in FIG. 1A. For example, the wireless network modem 104 may communicate on the wireless communication channels (e.g., the network traffic channels 108 and motion detection channel 110) as described with respect to FIG. 1A, and detect motion of object, for example, by processing motion detection signals. In some instances, the example wireless network modem 104 may operate in another manner.

The example wireless network modem 104 shown in FIG. 1B includes a baseband chip 111, a radio chip 112 and a radio frequency (RF) front end 113. The wireless network modem 104 may include additional or different features, and the components may be arranged as shown or in another manner. In some implementations, the baseband chip 111 includes the components and performs the operations of the baseband subsystem described with respect to the example modem 104A shown in FIG. 1A. In some implementations, the baseband chip 111 can process in-phase and quadrature signals (I and Q signals) from the radio chip 112 to extract data from received wireless signals. The baseband chip 111 may control the radio chip 112 or perform other operations. In some cases, the baseband chip 111 can be implemented as a digital signal processor (DSP) or another type of data processing apparatus.

In some implementations, the radio chip 112 and the RF front end 113 include the components and perform the operations of the radio subsystem described with respect to the example modem 104A shown in FIG. 1A. In some implementations, the radio chip 112 can produce in-phase and quadrature signals (I and Q signals), for example, in digital or analog format, based on received wireless signals. In some implementations, the RF front end 113 can include one or more antennas, filters, RF switches, couplers, RF gain chips or other components that condition radio frequency signals for transmission or processing.

Figure 2:
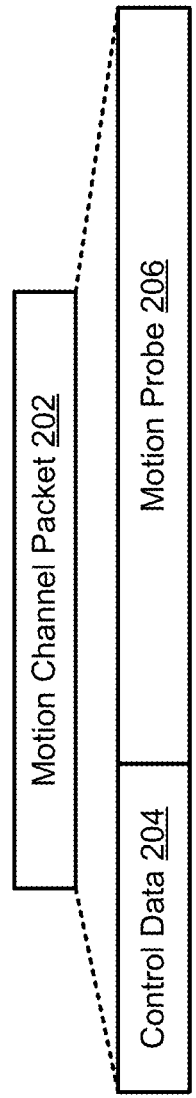
FIG. 2 is a diagram showing an example motion channel packet.

FIG. 2 is a diagram showing an example motion channel packet 202. The example motion channel packet 202 can be transmitted, for example, in a wireless network system in order to monitor for motion in a space. In some examples, the motion channel packet 202 is transmitted in the form of a motion detection signal on a motion detection channel in a wireless communication network. For instance, the motion channel packet 202 can include binary data that is converted to an analog signal, up-converted to radio frequency, and wirelessly transmitted by an antenna.

The example motion channel packet 202 shown in FIG. 2 includes control data 204 and a motion probe 206. A motion channel packet 202 may include additional or different features, and may be formatted in another manner. In the example shown, the control data 204 may include the type of control data that would be included in a conventional data packet. For instance, the control data 204 may include a preamble indicating the type of information contained in the motion channel packet 202, an identifier of a wireless device transmitting the motion channel packet 202, a MAC address of a wireless device transmitting the motion channel packet 202, a transmission power, etc. The motion probe 206 is the payload of the example motion channel packet 202. In some implementations, the motion probe 206 can be or include, for example, a pseudorandom code or another type of reference signal. In some implementations, the motion probe 206 can be or include, for example, a beacon signal broadcast by a wireless network system.

In an example, the motion channel packet 202 is wirelessly transmitted multiple times from the wireless network device 101A shown in FIG. 1A, and each transmission of the motion channel packet 202 is wirelessly received by the other wireless network device 101B. In some cases, the control data 204 changes with each transmission, for example, to indicate the time of transmission or updated parameters. The motion probe 206 can remain unchanged in each transmission of the motion channel packet 202 from the wireless network device 101A. The other wireless network device 101B can process the received signals based on each transmission of the motion channel packet 202, and analyze the motion probe 206 for changes. For instance, changes in the motion probe 206 may indicate movement of an object in a space accessed by the wireless transmission of the motion channel packet 202. In some cases, the other wireless network device 101B detects changes in the motion probe 206 over time (e.g., based on a sequence of transmissions) and generate motion data. The motion data can then be processed, for example, to generate a response to the detected motion.

Figure 3B:
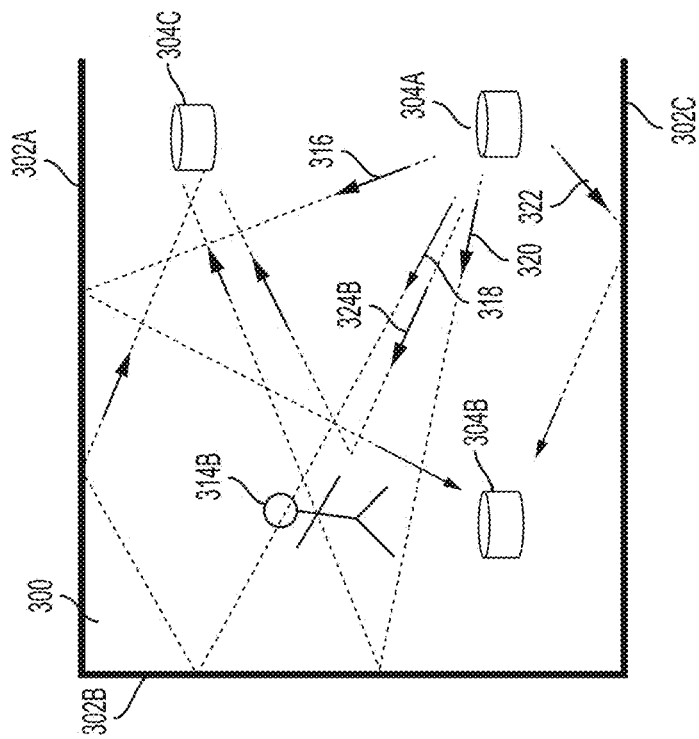
FIGS. 3A and 3B are diagrams showing example signals communicated between wireless network devices.
Figure 3A:
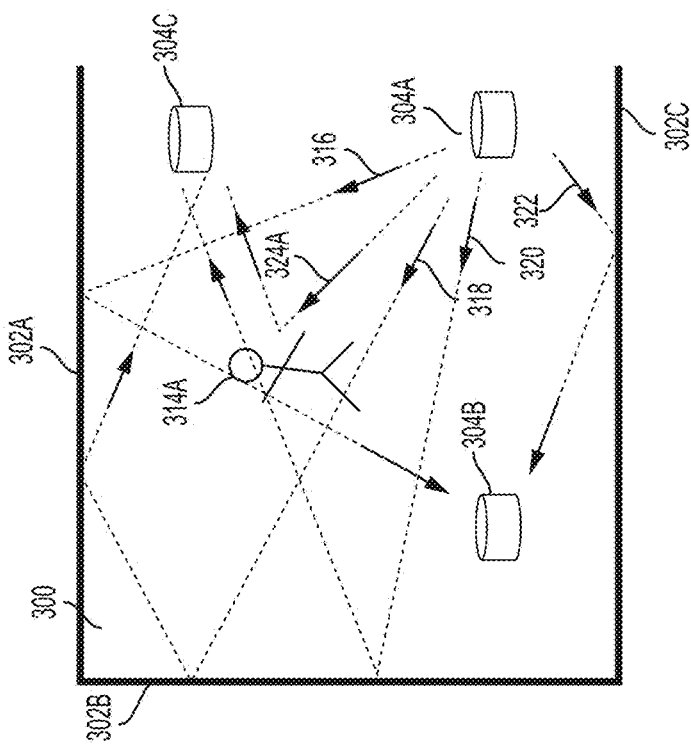

FIGS. 3A and 3B are diagrams showing example motion detection signals communicated between wireless network devices 304A, 304B, 304C. The wireless network devices 304A, 304B, 304C can be, for example, the wireless network devices 101A, 101B, 101C shown in FIG. 1A or another type of wireless network device. The example wireless network devices 304A, 304B, 304C transmit wireless signals in a space 300. The example space 300 can be completely or partially enclosed or open at one or more boundaries of the space. The space 300 can be or can include an interior of a room, multiple rooms, a building, an indoor area, outdoor area, or the like. A first wall 302A, a second wall 302B, and a third wall 302C at least partially enclose the space 300 in the example shown.

In the example shown in FIGS. 3A and 3B, the first wireless network device 304A is operable to transmit motion detection signals repeatedly (e.g., periodically, intermittently, at random intervals, etc.). The second and third wireless network devices 304B, 304C are operable to receive the transmitted motion detection signals. The wireless network devices 304B, 304C each have a modem that is configured to detect motion of an object in the space 300, for example, based on a comparison of the received motion detection signals over time.

As shown, an object is in a first position 314A in FIG. 3A, and the object has moved to a second position 314B in FIG. 3B. In FIGS. 3A and 3B, the moving object in the space 300 is represented as a human, but the moving object can be another type of object. For example, the moving object can be an animal, an inorganic object (e.g., a system, device, apparatus or assembly), an object that defines all or part of the boundary of the space 300 (e.g., a wall, door, window, etc.), or another type of object.

As shown in FIGS. 3A and 3B, multiple example paths of the motion detection signal transmitted from the first wireless network device 304A are illustrated by dashed lines. Along a first signal path 316, the motion detection signal is transmitted from the first wireless network device 304A and reflected off the first wall 302A toward the second wireless network device 304B. Along a second signal path 318, the motion detection signal is transmitted from the first wireless network device 304A and reflected off the second wall 302B and the first wall 302A toward the third wireless network device 304C. Along a third signal path 320, the motion detection signal is transmitted from the first wireless network device 304A and reflected off the second wall 302B toward the third wireless network device 304C. Along a fourth signal path 322, the motion detection signal is transmitted from the first wireless network device 304A and reflected off the third wall 302C toward the second wireless network device 304B.

In FIG. 3A, along a fifth signal path 324A, the motion detection signal is transmitted from the first wireless network device 304A and reflected off the object at the first position 314A toward the third wireless network device 304C. Between FIGS. 3A and 3B, a surface of the object moves from the first position 314A to a second position 314B in the space 300 (e.g., some distance away from the first position 314A). In FIG. 3B, along a sixth signal path 324B, the motion detection signal is transmitted from the first wireless network device 304A and reflected off the object at the second position 314B toward the third wireless network device 304C. The sixth signal path 324B depicted in FIG. 3B is longer than the fifth signal path 324A depicted in FIG. 3A due to the movement of the object from the first position 314A to the second position 314B. In some examples, a signal path can be added, removed or otherwise modified due to movement of an object in a space.

The example motion detection signals shown in FIGS. 3A and 3B may experience attenuation, frequency shifts, phase shifts or other effects through their respective paths and may have portions that propagate in another direction, for example, through the walls 302A, 302B, and 302C. In some examples, the motion detection signals are radio frequency (RF) signals; or the motion detection signals may include other types of signals.

In the example shown in FIGS. 3A and 3B, the first wireless network device 304A repeatedly transmits a motion detection signal. In particular, FIG. 3A shows the motion detection signal being transmitted from the first wireless network device 304A at a first time, and FIG. 3B shows the same signal being transmitted from the first wireless network device 304A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless network device 304A in an omnidirectional manner, in a directional manner or otherwise. In the example shown, the motion detection signals traverse multiple respective paths in the space 300, and the signal along each path may become attenuated due to path losses, scattering, reflection, or the like and may have a phase or frequency offset.

As shown in FIGS. 3A and 3B, the signals from various paths 316, 318, 320, 322, 324A, and 324B combine at the third wireless network device 304C and the second wireless network device 304B to form received signals. Because of the effects of the multiple paths in the space 300 on the transmitted signal, the space 300 may be represented as a transfer function (e.g., a filter) in which the transmitted signal is input and the received signal is output. When an object moves in the space 300, the attenuation or phase offset affected upon a signal in a signal path can change, and hence, the transfer function of the space 300 can change. Assuming the same motion detection signal is transmitted from the first wireless network device 304A, if the transfer function of the space 300 changes, the output of that transfer function—the received signal—will also change. A change in the received signal can be used to detect movement of an object.

Mathematically, a transmitted signal f(t) transmitted from the first wireless network device 304A may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless network device 304A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $a_{n,k}$ represents an attenuation factor (e.g., due to scattering, reflection, and path losses) for the $n^{th}$ frequency component along path k, and $\phi_{n,k}$ represents the phase of the signal for $n^{th}$ frequency component along path k. Then, the received signal R at a wireless network device can be described as the summation of all output signals $r_k(t)$ from all paths to the wireless network device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless network device can then be analyzed. The received signal R at a wireless network device can be transformed to the frequency domain, for example, using a Fast Fourier Transform (FFT) or another type of algorithm. The transformed signal can represent the received signal R as a series of n complex values, one for each of the respective frequency components (at then frequencies $\omega_n$). For a frequency component at frequency $\omega_n$, a complex number $Y_n$ may be represented as follows in Equation (5):

$$Y_n = \sum_k c_n \alpha_{n,k} e^{j\phi_{n,k}} \quad (5)$$

The complex value $Y_n$ for a given frequency component $\omega_n$ indicates a relative magnitude and phase offset of the received signal at that frequency component $\omega_n$.

With the first wireless network device 304A repeatedly (e.g., at least twice) transmitting the transmitted signal f(t) and a respective wireless network device 304B, 304C receiving and analyzing a respective received signal R, the respective wireless network device 304B, 304C can determine when a change in a complex value $Y_n$ (e.g., a magnitude or phase) for a given frequency component $\omega_n$ occurs that is indicative of movement of an object within the space 300. For example, a change in a complex value $Y_n$ for a given frequency component $\omega_n$ may exceed a predefined threshold to indicate movement. In some examples, small changes in one or more complex values $Y_n$ may not be statistically significant, but may only be indicative of noise or other effects.

In some examples, transmitted and received signals are in an RF spectrum, and signals are analyzed in a baseband bandwidth. For example, a transmitted signal may include a baseband signal that has been up-converted to define a transmitted RF signal, and a received signal may include a received RF signal that has been down-converted to a baseband signal. Because the received baseband signal is embedded in the received RF signal, effects of movement in the space (e.g., a change in a transfer function) may occur on the received baseband signal, and the baseband signal may be the signal that is processed (e.g., using a Fourier analysis or another type of analysis) to detect movement. In other examples, the processed signal may be an RF signal or another signal.

Figure 4:
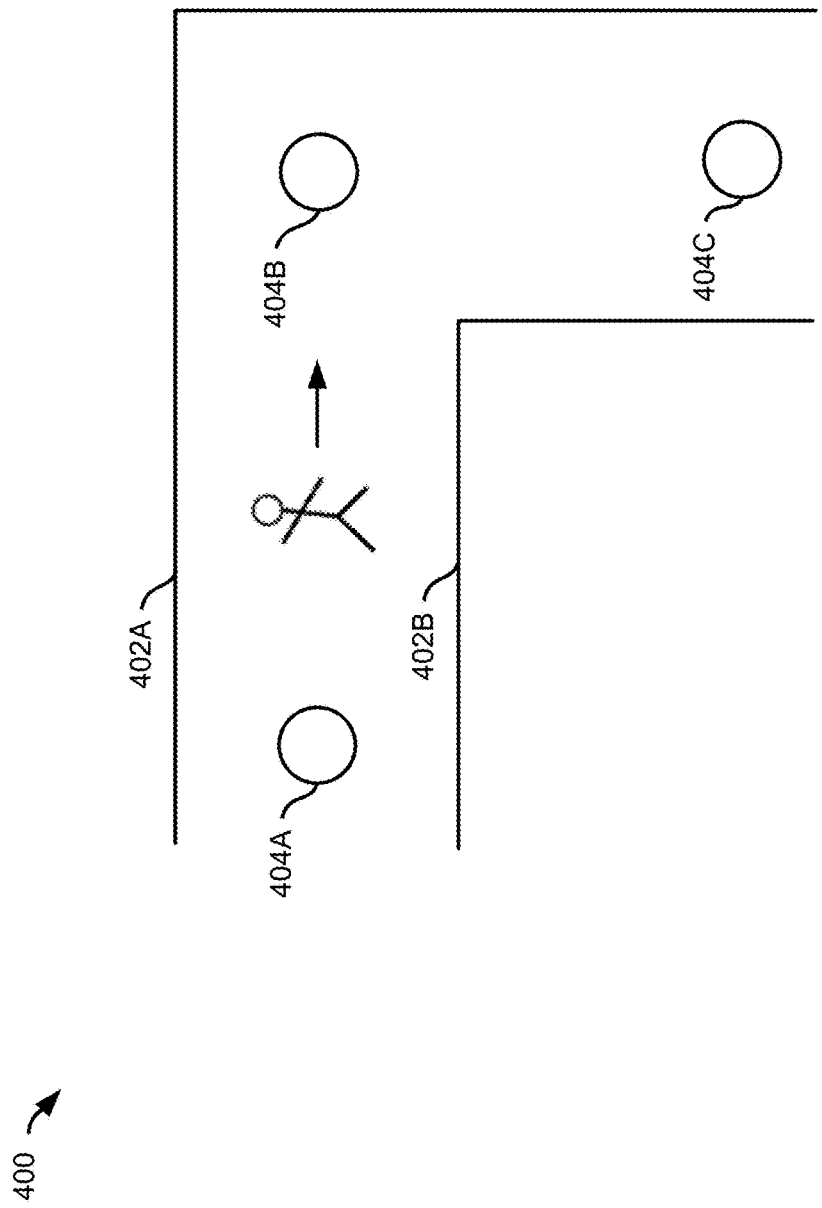
FIG. 4 is a diagram showing an environment that includes example wireless network devices.

FIG. 4 is a diagram showing an environment 400 that includes example wireless network devices 404A, 404B, 404C. The example wireless network devices 404A, 404B, 404C can be implemented according to the example wireless network devices 101A, 101B, 101C or otherwise. In the example shown in FIG. 4, the wireless network devices 404A, 404B, 404C are Wireless Access Point (WAP) devices, for example, in a wireless local area network (WLAN), in a wireless mesh network (WMN) or another type of wireless communication network. For instance, the wireless network devices 404A, 404B, 404C can form all or part of a mesh of Wi-Fi routers.

Accordingly, the example wireless network devices 404A, 404B, 404C are configured to communicate wireless network traffic in a Wi-Fi network. For example, the wireless network devices 404A, 404B, 404C may transmit or receive (or both) wireless network traffic on one or more Wi-Fi channels. In some cases, the wireless network devices 404A, 404B, 404C provide wireless network access to wireless devices in the environment 400. For example, smartphones, laptops, computer equipment, printers, smart devices (e.g., thermostats, light fixtures, door locksets, etc.) or other devices may access and communicate in the wireless local area network (WLAN) or wireless mesh network (WMN) through the wireless network devices 404A, 404B, 404C.

The example wireless network devices 404A, 404B, 404C are also configured to detect motion of an object in a space in the environment 400. For example, the wireless network devices 404A, 404B, 404C may transmit or receive (or both) motion detection signals on one or more Wi-Fi channels. The motion detection signals can include repeated Wi-Fi signals (e.g., a Wi-Fi beacon signal), reference signals generated for motion detection, or other types of signals. The motion detection signals can be transmitted through a space to be monitored for motion. In the example shown, the space includes two hallways defined by sidewalls 402A, 402B, and the moving object is a person walking through one of the hallways. For instance, the hallways can be corridors of an office building or industrial facility, hallways inside a home or another type of hallway.

In the example shown in FIG. 4, each of the wireless network devices 404A, 404B, 404C is associated with a location identifier. The location identifier can be, for example, a descriptive label, a GPS coordinate or another type of location identifier. For example, wireless network device 404A may be associated with "hallway 1," wireless network device 404B may be associated with "hallway intersection" and wireless network device 404C may be associated with "hallway 2."

As shown in FIG. 4, a person is walking (e.g., in "hallway 1") between two of the wireless network devices 404A and 404B, and either of the wireless network devices 404A, 404B may detect the person's movement. In some cases, the third wireless network device 404C also detects the motion of the person in "hallway 1." In some cases, the third wireless network device 404C does not detect the motion in "hallway 1." For example, each wireless network device may be configured to detect motion within a certain range, in a certain direction, etc.

In some aspects of operation, the wireless network devices 404A, 404B, 404C operate as wireless access points in a Wi-Fi network. In some instances, one or more of the wireless network devices 404A, 404B, 404C may detect motion in the environment 400 and generate motion data to be processed, for example, in the wireless network system or another system. For example, the wireless network device that detects motion may send a motion detection report to a server system. The motion detection report may indicate, for example, a time and location of the detected motion or other information. In the example shown in FIG. 4, the wireless network device 404A may send a motion detection report that indicates motion has been detected in "hallway 1." In response to the motion detection report, a server or another type of computer system may activate a programmed response. For example, the server (or other type of computing device) may activate a security alert (e.g., to alert security personnel), activate lighting or HVAC in the location where motion was detected (e.g., in "hallway 1" or both hallways) or perform a combination of these or other types of programmed responses.

Figure 5:
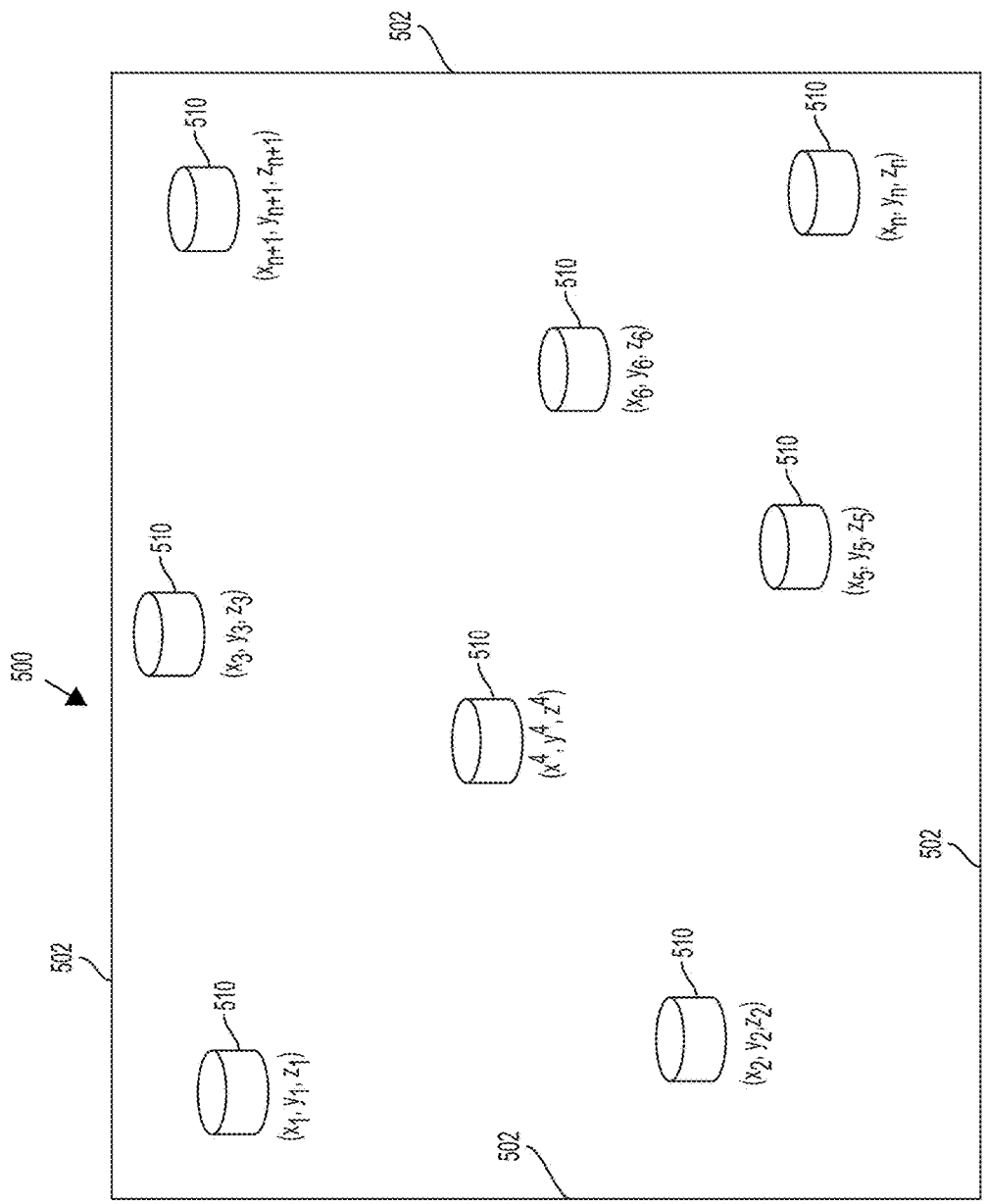
FIG. 5 is a diagram showing an example space that includes multiple wireless network devices.

FIG. 5 is a diagram showing an example space 500 that includes multiple wireless network devices 510. The wireless network devices 510 shown in FIG. 5 may be implemented according to the example wireless network devices 101A, 101B, 101C shown in FIG. 1A or otherwise. The example space 500 in FIG. 5 is defined, at least in part by four walls 502. In some implementations, the space 500 can be a room, multiple rooms, a building, or the like. As shown in FIG. 5, each wireless network devices 510 has a spatial location $(x_i, y_i, z_i)$ and can monitor and analyze received signals at its respective spatial location $(x_i, y_i, z_i)$.

Additionally, in some example implementations, each wireless network device 510 can transmit information (e.g., characteristics of a received signal, an indication of detected motion, an identification of the detected motion, a time of the detected motion, an identifier or location of the wireless network devices, or the like) to a data aggregation system (e.g., as discussed below in FIG. 6). For example, the location and time information can include spatial coordinates of the wireless network device (e.g., $(x_i, y_i, z_i)$ or in other coordinates) and temporal coordinates (e.g., a time of day) at which motion is detected. FIG. 5 shows example spatial coordinates of the wireless network devices 510 in the space 500.

Figure 6:
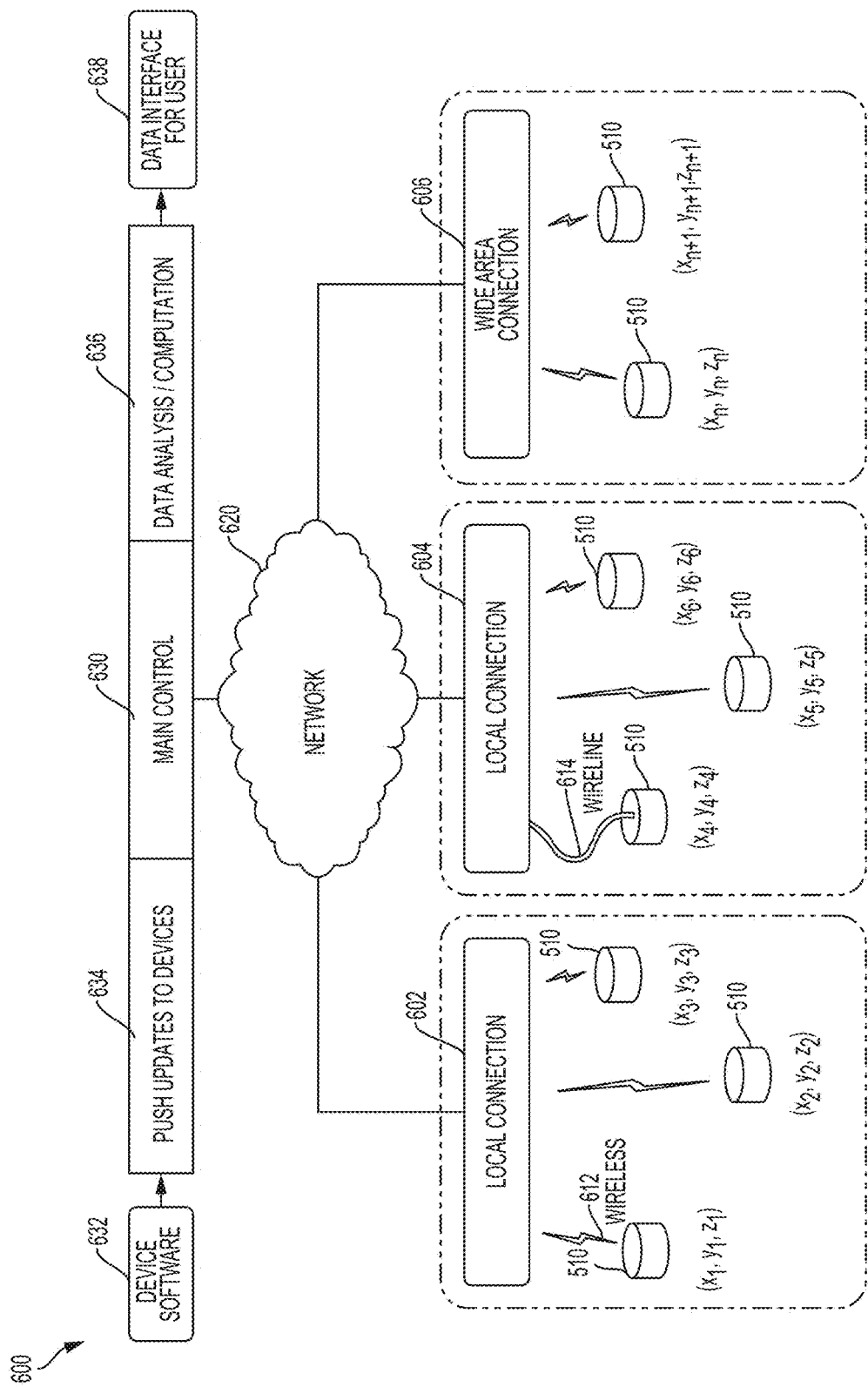
FIG. 6 is a block diagram showing an example system architecture.

FIG. 6 is a block diagram showing an example system architecture 600. The example system architecture 600 includes the wireless network devices 510 shown in FIG. 5, which may be implemented according to the example wireless network devices 101A, 101B, 101C shown in FIG. 1A or otherwise. The example system architecture 600 also includes a network 620 and a main controller 630. The system architecture 600 can include additional or different components. In some implementations, a wireless network system that includes motion detection capabilities can be arranged as shown in FIG. 6 or in another manner.

In the example shown in FIG. 6, each wireless network device 510 resides at a respective physical location having spatial coordinates $(x_i, y_i, z_i)$, where i varies from 1 to n+1 (n+1 being the number of the wireless network devices 510). In some implementations, each wireless network device 510 can include a Global Positioning System (GPS) or another location identification system that identifies the location coordinates of the wireless network device 510, or the location coordinates can be identified in another manner. In some implementations, each wireless network device 510 has a unique identifier, and the identifier can be associated with a location identifier or location coordinates.

The example wireless network devices 510 can receive motion detection signals from other wireless network devices. The motion detection signals may be transmitted on a motion detection channel, in some cases, while one or more of the wireless network devices 510 also communicate wireless network traffic on one or more network traffic channels. The wireless network devices 510 can process the received motion detection signals to detect motion of objects, for example, by analyzing the received motion detection signals for changes. Some changes, e.g., statistically significant changes, in a received signal can indicate movement in a space.

In the example shown in FIG. 6, data from the wireless network devices (e.g., motion indications, location information, etc.) are received by a data aggregation or central control system (e.g., the main controller 630). In some implementations, data from the wireless network devices are aggregated by the main controller 630 by receiving the messages transmitted from the wireless network devices, for example, through the network 620. The network 620 can be, for example, an IP network, an enterprise network, a virtual private network, a local area network or another type of network.

In some implementations, the wireless network devices are connected to the network 620 via a local connection (e.g., local connection 602 or 604). For instance, the wireless network devices can be connected to the network 620 by a wireline connection 614 or wireless connection 612. The wireline connection 614 can include, for example, Ethernet connections, xDSL (x-digital subscriber line) connections, optical connections or other types of wireline connections. The wireless connections 612 can include, for example, Wi-Fi, Bluetooth, near field communication (NFC), or other types of local wireless connections. In some implementations, some of the wireless network devices are connected to the network 620 through one or more wide area connections 606. The wide area connection 606 can include, for example, a virtual private network or other types of connections.

The main controller 630 can be a computing system that includes one or more computing devices. The main controller 630 or any of its components can be located at a data processing center, a computing facility, or another location. In the example shown, the main controller 630 can control and monitor operation of the wireless network devices 510. Example functions of the main controller 630 can include aggregating the information from some or all of the wireless network devices, upgrading the wireless network device software, monitoring states of the wireless network devices, etc. For example, the main controller 630 may send software updates to some or all wireless network devices.

In some implementations, the main controller 630 receives information related to movement detection (e.g., indication of movement detection, movement signature, detected changes in complex values representing magnitudes and phases of frequency components, spatial and temporal coordinates for each of the wireless network devices, etc.) transmitted from the wireless network devices. The main controller 630 can include or be coupled to a data analysis system 636 that can aggregate (e.g., assemble, compile or otherwise manage) the information related to movement detection from the multiple wireless network devices and generate an incident report, e.g., when motion is detected. In some cases, the information related to motion detection from the multiple wireless network devices is used to determine whether lights, HVAC, security systems (e.g., door locks) or other systems should be activated or deactivated.

In some instances, the incident report can be presented on a data interface 638 to present users the indication of movement or other information from the wireless network devices relative to the various locations of the wireless network devices. For example, the incident report can indicate detected movements based on time and location or other information, which may be helpful to determine a source of movement. In some implementations, the data analysis system 636 can analyze real-time data, historical data, or a combination of both, and determine when movement occurs at a location. Accordingly, the main controller 630 may be used as a control center of a security system, where personnel are able to be alerted to detected movement and to dispatch security or police in response to the alert.

Figure 7:
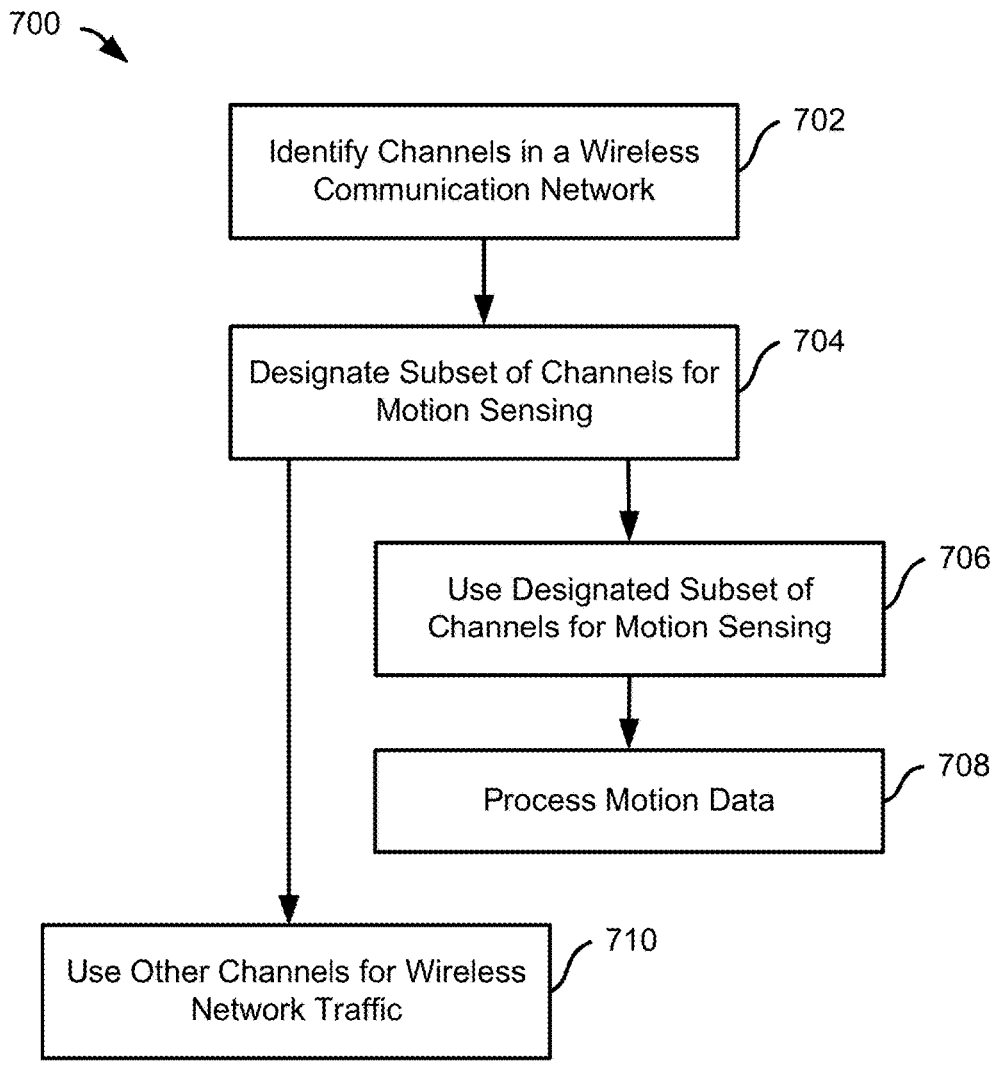
FIG. 7 is a flow chart showing an example process for operating a wireless communication network.

FIG. 7 is a flow chart showing an example process 700 for operating a wireless communication network. The example process 700 can be performed, for example, by a wireless network system that includes wireless network devices. For instance, operations in the process 700 may be performed by the wireless network system 100 shown in FIG. 1A or another type of system. In some cases, one or more operations in the example process 700 can be performed or utilized in a network installation or configuration process, in a network operation process, or in another type of process.

The example process 700 may include additional or different operations, and the operations may be performed in the order shown or in another order. In some cases, one or more of the operations shown in FIG. 7 are implemented as processes that include multiple operations, sub-processes for other types of routines. In some cases, operations can be combined, performed in another order, performed in parallel, iterated or otherwise repeated or performed another manner.

At 702, channels in a wireless communication network are identified. The channels can be, for example, the type of wireless communication channels shown in FIG. 1A. At 704, a subset of the channels are designated for motion sensing. The subset of channels can be a single channel or multiple channels designated, for example, by a setting in a wireless network server, by a setting on a wireless network device or otherwise. In some cases, the subset of channels is designated upon installation or configuration of the wireless network system. In some cases, the subset of channels is designated during operation of the wireless network system.

At 706, the designated subset of channels is used for motion sensing. For example, the designated subset of channels can be used to detect motion of objects as shown and described with respect to FIGS. 3A, 3B and 4, or the designated subset of channels can be used to detect motion in another manner. In some implementations, the wireless network devices use the designated subset of channels for motion sensing by receiving and processing radio frequency signals. For example, motion detection signals can be processed to detect motion of objects in an indoor or outdoor space.

At 708, motion data are processed. For example, the motion data may be processed by a wireless network device that performs the motion sensing (at 706) or by a wireless network server that receives motion data from wireless network devices. The motion data may include, for instance, an indication that motion has been detected by a wireless network device. The motion data may indicate a time when motion was detected, an identity of a device that detected motion, a location of the detected motion, etc. In some cases, the motion data are processed as part of a security protocol, for example, to determine whether security has been breached. In some cases, the motion data are processed as part of a power management protocol, for example, to determine whether lights, HVAC, security systems (e.g., door locks) or other systems should be activated or deactivated.

At 710, other channels (channels other than the subset designated for motion sensing) are used for communicating wireless network traffic. For example, the wireless network devices may use the other channels for wireless communication with other devices (e.g., user equipment, client devices, etc.) that have wireless access to the wireless communication network, with a wireless network server, etc. In some cases, the other channels are used for wireless network traffic while the designated subset of channels is used for motion sensing. In other words, motion sensing operations can operate in parallel with communication of wireless network traffic. In some cases, a wireless network device uses the same chipset for both motion sensing and communication of wireless network traffic, for instance, by alternating between using the motion sensing channels and network traffic channels.

In a general aspect of some of the examples described, a wireless device operates a motion detection channel and other wireless communication channels.

In a first example, a modem of a first wireless network device communicates wireless network traffic on a first subset of wireless communication channels in a wireless communication network. The modem of the first wireless network device receives motion detection signals transmitted through a space by a second wireless network device. The motion detection signals are received on a second subset of wireless communication channels. The motion detection signals are processed to detect motion of an object in the space.

Implementations of the first example may, in some cases, include one or more of the following features. The wireless communication network can be a wireless local area network (WLAN), and the first wireless network device can be a wireless access point (WAP) device. The wireless communication network can be a wireless mesh network (WMN), and the first wireless network device can be a wireless access point (WAP) device.

Implementations of the first example may, in some cases, include one or more of the following features. The motion detection signals transmitted by the second wireless network device can each include control data and a motion probe. The modem of the first wireless network device can detect motion of an object in the space by comparing the motion probes from the respective motion detection signals. An indication of motion detection can be generated in response to detecting motion.

Implementations of the first example may, in some cases, include one or more of the following features. The wireless network traffic can be communicated and the motion detection signals are received in parallel. The wireless communication channels can include frequency channels, coded channels or a combination of these and other types of channels.

In a second example, a wireless network modem includes a radio subsystem and a baseband subsystem. The radio subsystem is configured to communicate wireless signals on multiple wireless communication channels. The baseband subsystem is coupled to the radio subsystem and configured to: communicate wireless network traffic in a wireless communication network, the wireless network traffic communicated through the radio subsystem on a first subset of the wireless communication channels; receive motion detection signals transmitted through a space by another wireless network device, the motion detection signals received through the radio subsystem on a second subset of the wireless communication channels; and process the motion detection signals to detect motion of an object in the space.

Implementations of the second example may, in some cases, include one or more of the following features. The radio subsystem can include a radio frequency (RF) front end and a radio chip. The baseband subsystem can include a digital baseband chip.

Implementations of the second example may, in some cases, include one or more of the following features. The motion detection signals transmitted by the other wireless network device can each include control data and a motion detection probe. The baseband subsystem can be configured to detect motion of an object based on comparing the motion detection probes in the respective motion detection signals transmitted.

Implementations of the second example may, in some cases, include one or more of the following features. The baseband subsystem can be configured to generate an indication of motion detection in response to detecting motion. The baseband subsystem can be configured to send the indication of motion detection to another device through the wireless communication network. The radio subsystem can be configured to communicate the wireless network traffic and receive the motion detection signals in parallel. The wireless communication channels can include frequency channels, coded channels or a combination of these and other types of channels.

In a third example, a system includes a first wireless network device and a second wireless network device. The first wireless network device includes a first modem configured to: communicate wireless network traffic in a wireless communication network on a first subset of wireless communication channels; and transmit motion detection signals on a second subset of wireless communication channels. The second wireless network device comprising a second modem configured to: receive the motion detection signals on the second subset of wireless communication channels; and process the motion detection signals to detect motion of an object in a space accessed by the motion detection signals.

Implementations of the third example may, in some cases, include one or more of the following features. The wireless communication network can be a wireless local area network (WLAN), and the first or second wireless network device (or both) can be a wireless access point (WAP) device. The wireless communication network can be a wireless mesh network (WMN), and the first or second wireless network device (or both) can be a wireless access point (WAP) device.

Implementations of the third example may, in some cases, include one or more of the following features. The first modem can include a first radio subsystem and a first baseband subsystem. The first baseband subsystem can be configured to: communicate the wireless network traffic through the first radio subsystem on the first subset of wireless communication channels; and transmit the motion detection signals through the first radio subsystem on the second subset of wireless communication channels. The second modem can include: a second radio subsystem configured to receive the motion detection signals on the second subset of wireless communication channels; and a second baseband subsystem configured to process the motion detection signals to detect the motion of the object.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A wireless network method comprising:
   by operation of a modem of a first wireless network device, communicating wireless network traffic on a first subset of wireless communication channels in a wireless communication network;
   by operation of the modem of the first wireless network device, receiving motion detection signals transmitted through a space by a second wireless network device, the motion detection signals received on a second subset of wireless communication channels, the motion detection signals transmitted by the second wireless network device each comprising control data and a motion probe, each motion probe comprising a reference signal or a beacon signal;
   communicating the wireless network traffic and receiving the motion detection signals in parallel;
   processing the motion detection signals to detect motion of an object in the space; and
   by operation of the modem of the first wireless network device, detecting motion of the object in the space by comparing the motion probes from the respective motion detection signals.

2. The wireless network method of claim 1, wherein the wireless communication network comprises a wireless local area network (WLAN), and the first wireless network device comprises a wireless access point (WAP) device.

3. The wireless network method of claim 1, wherein the wireless communication network comprises a wireless mesh network (WMN), and the first wireless network device comprises a wireless access point (WAP) device.

4. The wireless network method of claim 1, comprising generating an indication of motion detection in response to detecting motion.

5. The wireless network method of claim 1, wherein the wireless communication channels comprise frequency channels.

6. The wireless network method of claim 1, wherein the wireless communication channels comprise coded channels.

7. The wireless network method of claim 1, wherein the second wireless network device is a motion detection device.

8. A wireless network modem comprising:
a radio subsystem configured to communicate wireless signals on a plurality of wireless communication channels; and
a baseband subsystem coupled to the radio subsystem and configured to:
communicate wireless network traffic in a wireless communication network, the wireless network traffic communicated to another wireless network device through the radio subsystem on a first subset of the wireless communication channels;
receive motion detection signals transmitted through a space by the other wireless network device, the motion detection signals received through the radio subsystem on a second subset of the wireless communication channels, the motion detection signals transmitted by the other wireless network device each comprising control data and a motion detection probe, each motion detection probe comprising a reference signal or a beacon signal;
communicate the wireless network traffic and receive the motion detection signals in parallel;
process the motion detection signals to detect motion of an object in the space; and
detect motion of the object based on comparing the motion detection probes in the respective motion detection signals transmitted.

9. The wireless network modem of claim 8, wherein the radio subsystem comprises a radio frequency (RF) front end and a radio chip.

10. The wireless network modem of claim 8, wherein the baseband subsystem comprises a digital baseband chip.

11. The wireless network modem of claim 8, wherein the baseband subsystem is configured to generate an indication of motion detection in response to detecting motion.

12. The wireless network modem of claim 11, wherein the baseband subsystem is configured to send the indication of motion detection to another device through the wireless communication network.

13. The wireless network modem of claim 8, wherein the wireless communication channels comprise frequency channels.

14. The wireless network modem of claim 8, wherein the wireless communication channels comprise coded channels.

15. A system comprising:
a first wireless network device comprising a first modem configured to:
communicate wireless network traffic in a wireless communication network on a first subset of wireless communication channels; and
transmit motion detection signals on a second subset of wireless communication channels, the motion detection signals each comprising control data and a motion probe, each motion probe comprising a reference signal or a beacon signal;
communicate the wireless network traffic and transmit the motion detection signals in parallel; and
a second wireless network device comprising a second modem configured to:
receive the motion detection signals on the second subset of wireless communication channels;
process the motion detection signals to detect motion of an object in a space accessed by the motion detection signals; and
detect motion of the object based on comparing the motion detection probes in the respective motion detection signals transmitted.

16. The wireless communication system of claim 15, wherein the wireless communication network comprises a wireless local area network (WLAN), and the first wireless network device comprises a wireless access point (WAP) device.

17. The wireless communication system of claim 15, wherein the wireless communication network comprises a wireless mesh network (WMN), and the first wireless network device comprises a wireless access point (WAP) device.

18. The wireless communication system of claim 15, wherein the first modem comprises a first radio subsystem and a first baseband subsystem, the first baseband subsystem is configured to:
communicate the wireless network traffic through the first radio subsystem on the first subset of wireless communication channels; and
transmit the motion detection signals through the first radio subsystem on the second subset of wireless communication channels.

19. The wireless communication system of claim 18, wherein the second modem comprises:
a second radio subsystem configured to receive the motion detection signals on the second subset of wireless communication channels; and
a second baseband subsystem configured to process the motion detection signals to detect the motion of the object.

* * * * *